US009537921B2

(12) United States Patent
Zhang et al.

(10) Patent No.: US 9,537,921 B2
(45) Date of Patent: Jan. 3, 2017

(54) MOBILE-TO-MOBILE STREAMING OF REAL-TIME CONTENT FOR PRESENTATION BY AN OUTPUT DEVICE

(71) Applicant: Verizon Patent and Licensing Inc., Arlington, VA (US)

(72) Inventors: Gong Zhang, Waltham, MA (US); Jian Huang, Sudbury, MA (US); Jianxiu Hao, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 120 days.

(21) Appl. No.: 14/462,991

(22) Filed: Aug. 19, 2014

(65) Prior Publication Data

US 2016/0057191 A1    Feb. 25, 2016

(51) Int. Cl.
*H04N 7/173* (2011.01)
*H04L 29/06* (2006.01)

(52) U.S. Cl.
CPC .................................. *H04L 65/602* (2013.01)

(58) Field of Classification Search
CPC ..................... H04N 21/47202; H04N 7/17318; H04N 7/17336
USPC .............. 725/87–93, 109–116; 709/217–232
See application file for complete search history.

(56) References Cited

U.S. PATENT DOCUMENTS

| 7,577,240 | B2 * | 8/2009 | Goodman | H04H 20/81 379/90.01 |
| 8,924,864 | B2 * | 12/2014 | Mariotti | G06F 19/321 715/753 |
| 2004/0047461 | A1 * | 3/2004 | Weisman | H04M 3/42008 379/202.01 |
| 2004/0114036 | A1 * | 6/2004 | Karaoguz | G08B 13/19656 348/142 |
| 2004/0162878 | A1 * | 8/2004 | Lewis | H04L 12/581 709/204 |
| 2004/0240642 | A1 * | 12/2004 | Crandell | H04M 7/128 379/88.22 |

(Continued)

OTHER PUBLICATIONS

Wikipedia, "Chromecast", http://en.wikipedia.org/wiki/Chromecast, Aug. 8, 2014, 9 pages.

(Continued)

*Primary Examiner* — Annan Shang (57) ABSTRACT

A content providing device may receive an indication to stream real-time content. The real-time content may include content captured by the content providing device. The content providing device may identify a dynamic content address, associated with the content providing device, to be used by a content receiving device to access the real-time content. The dynamic content address may identify an address of the content providing device from which the real-time content is to be streamed. The content providing device may provide the dynamic content address. The content providing device may receive, from the content receiving device, a request to access the real-time content, via the dynamic content address, based on providing the dynamic content address. The content providing device may stream the real-time content to the content receiving device, using the dynamic content address, based on receiving the request.

20 Claims, 7 Drawing Sheets

(56) References Cited

U.S. PATENT DOCUMENTS

| | | | | |
|---|---|---|---|---|
| 2005/0055713 A1* | 3/2005 | Lee | H04N 7/163 | 725/46 |
| 2005/0071744 A1* | 3/2005 | Dunbar | G11B 20/12 | 715/200 |
| 2006/0073795 A1* | 4/2006 | Mayblum | H04N 7/148 | 455/90.2 |
| 2006/0189393 A1* | 8/2006 | Edery | A63F 13/12 | 463/58 |
| 2008/0072247 A1* | 3/2008 | Barnard | H04H 20/82 | 725/32 |
| 2008/0112411 A1* | 5/2008 | Stafford | H04W 88/18 | 370/392 |
| 2008/0184317 A1* | 7/2008 | Khedouri | G06F 17/30094 | 725/86 |
| 2008/0231684 A1* | 9/2008 | Underwood | H04N 7/147 | 348/14.01 |
| 2009/0021585 A1* | 1/2009 | Ko | G08B 13/19656 | 348/184 |
| 2009/0167839 A1* | 7/2009 | Ottmar | H04N 7/17318 | 348/14.08 |
| 2009/0233542 A1* | 9/2009 | Gratton | H04H 60/80 | 455/3.06 |
| 2009/0282098 A1* | 11/2009 | Karaoguz | G08B 13/19658 | 709/203 |
| 2012/0182384 A1* | 7/2012 | Anderson | H04L 12/1827 | 348/14.09 |
| 2014/0229866 A1* | 8/2014 | Gottlieb | H04L 65/403 | 715/758 |
| 2014/0351870 A1* | 11/2014 | Amine | H04N 21/2665 | 725/92 |

OTHER PUBLICATIONS

Wikipedia, "Apple TV", http://en.wikipedia.org/wiki/Apple_TV, Aug. 19, 2014, 26 pages.

Wikipedia, "AirPlay", http://en.wikipedia.org/wiki/AirPlay, Aug. 16, 2014, 10 pages.

\* cited by examiner

MOBILE-TO-MOBILE STREAMING OF REAL-TIME CONTENT FOR PRESENTATION BY AN OUTPUT DEVICE

BACKGROUND

Streaming media may refer to multimedia content (e.g., audio, video, streaming text, etc.) that is constantly received by and presented to an end user while being delivered by a provider. A client media player may begin playing the multimedia content before an entire file, containing the multimedia content, has been transmitted to and/or received by the client media player.

DETAILED DESCRIPTION OF PREFERRED EMBODIMENTS

The following detailed description of example implementations refers to the accompanying drawings. The same reference numbers in different drawings may identify the same or similar elements.

A user may want to share real-time streaming content with another user. For example, the user may record a live event using a mobile device (e.g., a smart phone), and may want to share the recording in real-time (e.g., as the live event is being recorded) with another user. The other user may want to stream the recording on a mobile device, or may want to stream the recording on an output device, such as a television. In this way, the user that is at the live event and the user that is not at the live event may both enjoy the live event in real-time. Furthermore, users may stream content other than static content that is stored by a server device. Implementations described herein assist in streaming real-time content between mobile devices, and further assist in streaming the real-time content from a mobile device to an output device, such as a television.

Figure 1:
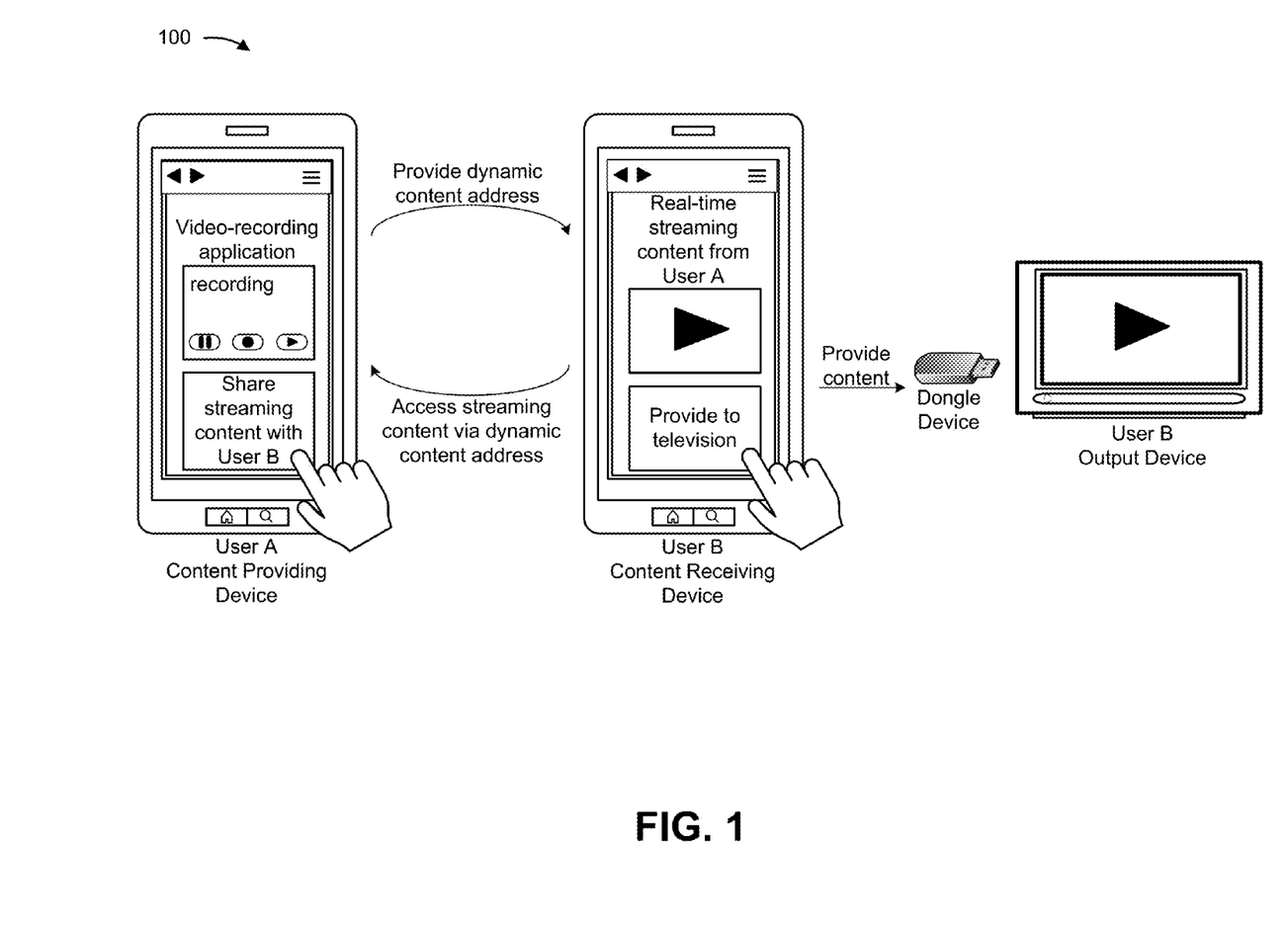
FIG. 1 is a diagram of an overview of an example implementation described herein.

FIG. 1 is a diagram of an overview of an example implementation 100 described herein. As shown in FIG. 1, assume that a first user, shown as User A, interacts with a content providing device (e.g., a mobile device, such as a smart phone, a tablet, etc.) to record a real-time video. As further shown, User A interacts with the content providing device to indicate that the recorded content is to be streamed to a content receiving device (e.g., a mobile device) associated with a second user, shown as User B. Based on the user interaction, User A's content providing device provides a dynamic content address to User B's content receiving device, and User B's content receiving device uses the dynamic content address to access the streaming content. The dynamic content address may identify a component (e.g., a streaming server application) of User A's content providing device that is capable of providing the streaming content.

As further shown in FIG. 1, User B's content receiving device may stream the accessed content on a display of the content receiving device. Furthermore, User B may interact with the content receiving device to cause the content receiving device to provide the streaming content to another device, such as an output device (e.g., a television, a display device, etc.). In some implementations, User B's content receiving device may provide the streaming content to the output device via a dongle device in communication with the output device, such as High-Definition Multimedia Interface (HDMI) dongle, or the like. Additionally, or alternatively, User A may concurrently stream the real-time content to multiple users. In this way, multiple users may enjoy a live event through the eyes of one of the users, even if all of the users are not located at the live event.

Figure 2:
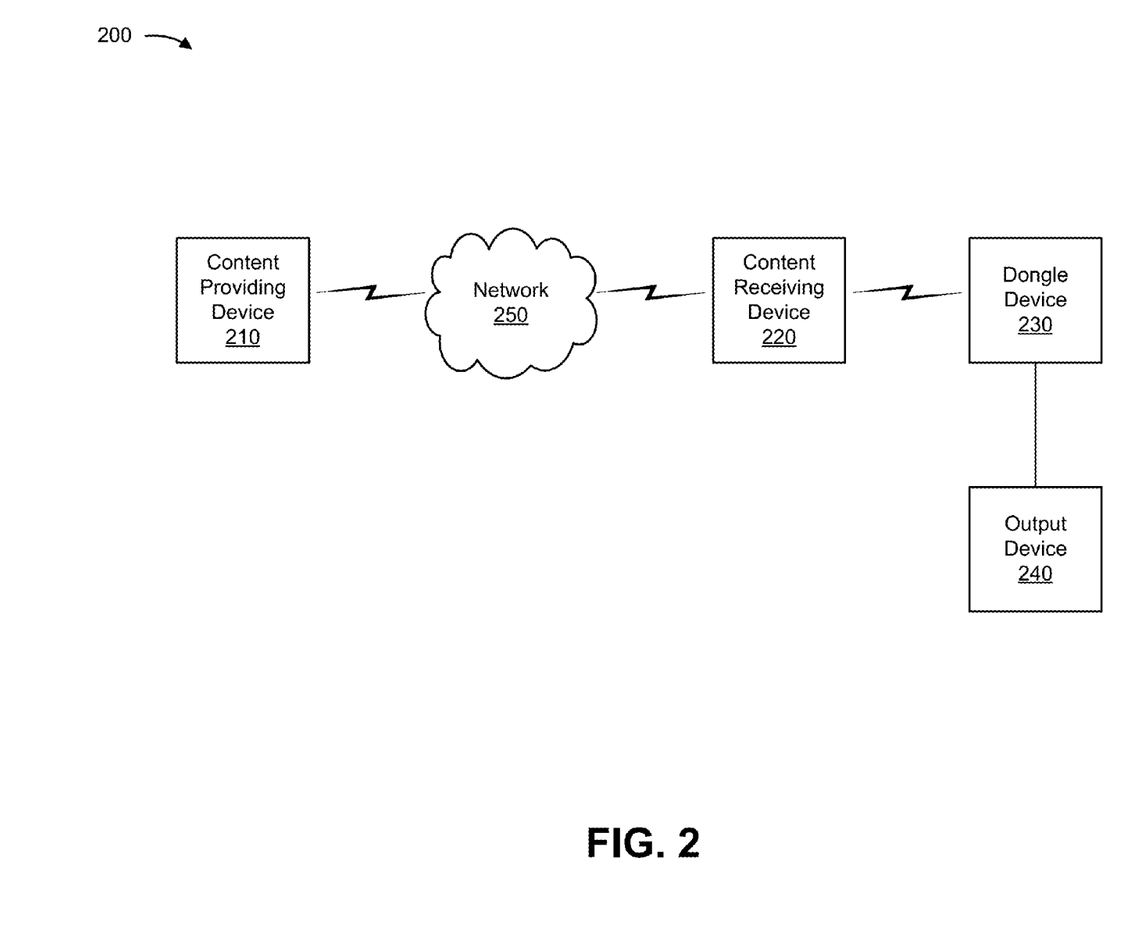
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a content providing device 210, a content receiving device 220, a dongle device 230, an output device 240, and a network 250. Devices of environment 200 may interconnect via wired connections, wireless connections, or a combination of wired and wireless connections.

Content providing device 210 may include one or more devices (e.g., mobile devices) capable of receiving, generating, storing, processing, and/or providing real-time content (e.g., audio content, video content, text content, etc.). For example, content providing device 210 may include a mobile device, such as a smart phone, a tablet computer, a laptop computer, a gaming device, a wearable device (e.g., smart glasses, a smart watch, etc.), a camcorder, a camera, or a similar type of device. In some implementations, content providing device 210 may record real-time content from an environment in which content providing device 210 is located. Additionally, or alternatively, a user may interact with content providing device 210 to identify real-time content to be provided to content receiving device 220. While shown as separate devices, content providing device 210 and content receiving device 220 may be implemented within a single device, which may be capable of receiving and providing content as described herein.

Content receiving device 220 may include one or more devices capable of receiving real-time content and/or outputting the real-time content. For example, content receiving device 220 may include a computing and/or communications device, such as a mobile device (e.g., a smart phone, a tablet computer, a laptop computer, a gaming device, etc.), a television, a computer (e.g., with a computer monitor), a wearable device (e.g., smart glasses, a smart watch, etc.), or a similar type of device. Content receiving device 220 may receive real-time content from content providing device 210, and may provide the real-time content for display. Additionally, or alternatively, content receiving device 220 may provide the real-time content to output device 240 for presentation (e.g., for audio presentation, for video presentation, for display, etc.). In some implementations, content receiving device 220 may provide the real-time content to output device 240 via dongle device 230.

Dongle device 230 may include one or more devices capable of receiving and/or outputting real-time content. For example, dongle device 230 may include an HDMI dongle, a device with an HDMI interface, a universal serial bus (USB) dongle, a device with a USB interface, or a similar type of device. In some implementations, dongle device 230 may receive real-time content, streamed from content providing device 210, via content receiving device 220. Dongle device 230 may provide the real-time content to output device 240, which may provide the real-time content for presentation.

Output device 240 may include one or more devices capable of providing content (e.g., real-time content). For example, output device 240 may include a television, a computer monitor, a smart phone, a tablet computer, a projector, a radio, a speaker, a sound system, or a similar type of device. In some implementations, output device 240 may receive real-time content, streamed from content providing device 210, via content receiving device 220 and/or dongle device 230. Output device 240 may output the real-time content (e.g., via a display, a speaker, etc.).

Network 250 may include one or more wired and/or wireless networks. For example, network 250 may include a cellular network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
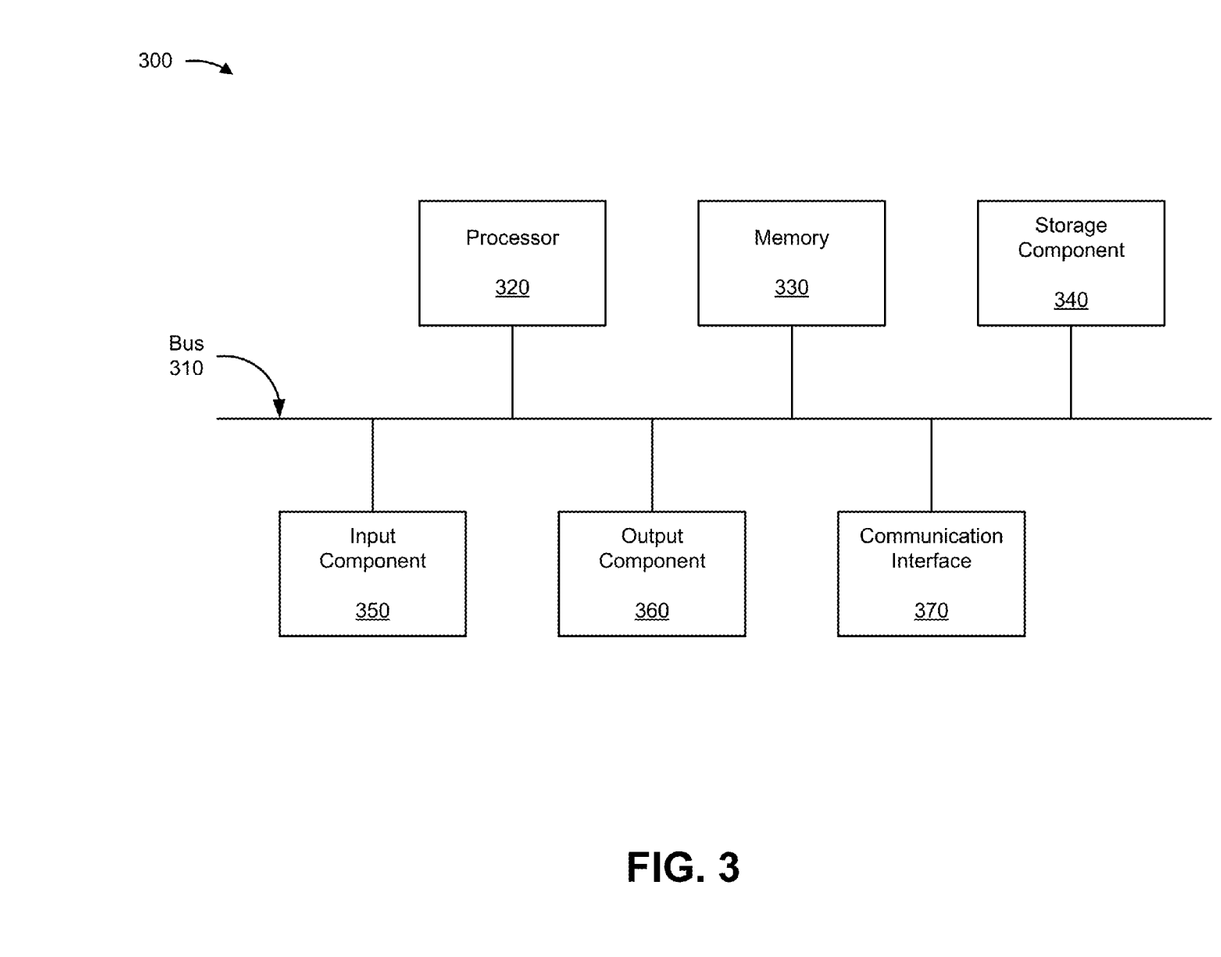
FIG. 3 is a diagram of example components of one or more devices of FIG. 2.

FIG. 3 is a diagram of example components of a device 300. Device 300 may correspond to content providing device 210, content receiving device 220, dongle device 230, and/or output device 240. In some implementations, content providing device 210, content receiving device 220, dongle device 230, and/or output device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
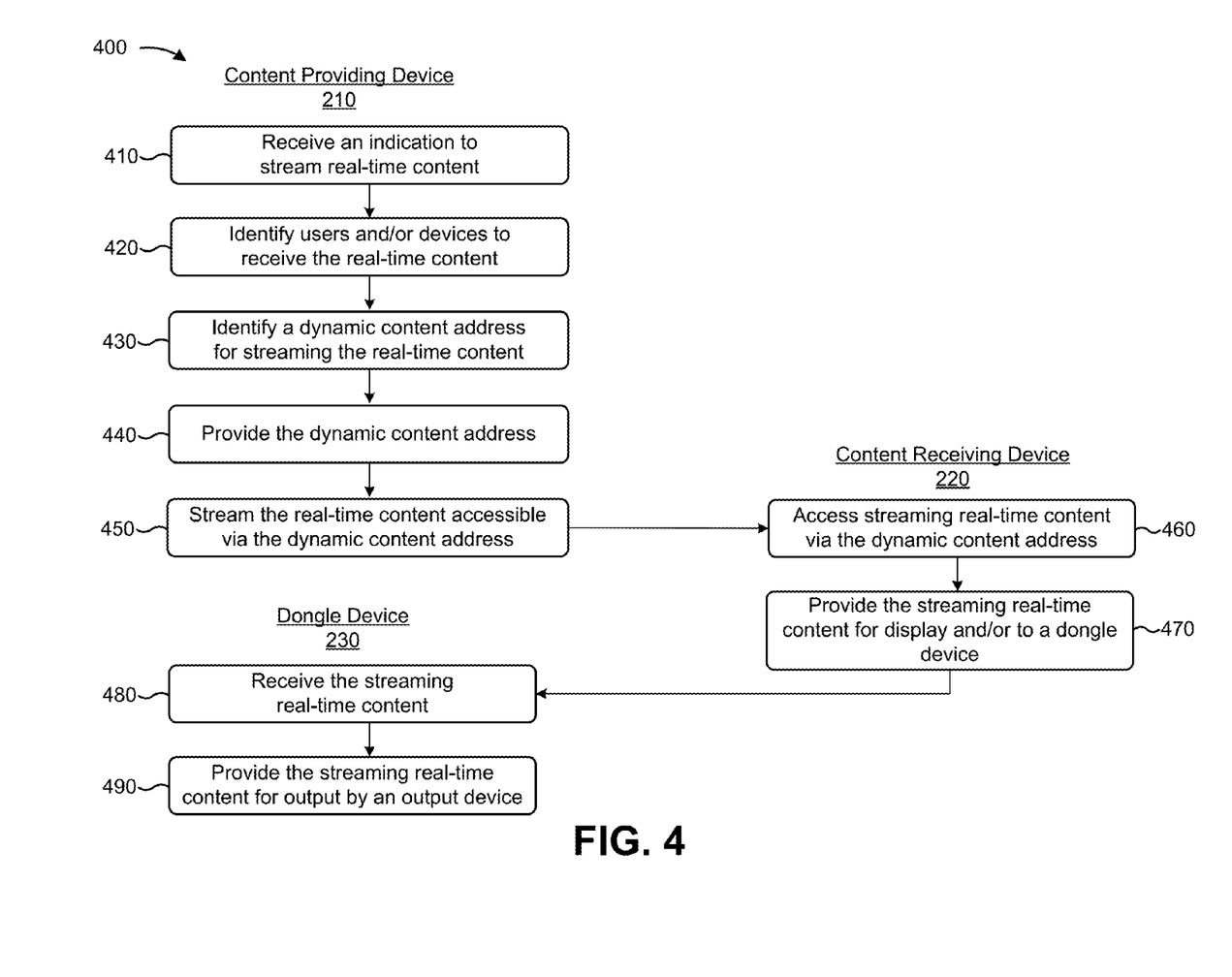
FIG. 4 is a flow chart of an example process for mobile-to-mobile streaming of real-time content for output by an output device.

FIG. 4 is a flow chart of an example process 400 for mobile-to-mobile streaming of real-time content for output by an output device. In some implementations, one or more process blocks of FIG. 4 may be performed by content providing device 210, content receiving device 220, and/or dongle device 230. Additionally, or alternatively, one or more process blocks of FIG. 4 may be performed by another device or a group of devices separate from or including content providing device 210, content receiving device 220, and/or dongle device 230, such as output device 240.

As shown in FIG. 4, process 400 may include receiving an indication to stream real-time content (block 410). For example, content providing device 210 may receive, based on user input, an indication to stream real-time content. In some implementations, a user may interact with content providing device 210 to provide the indication. For example, the user may open a real-time content streaming application on content providing device 210, and/or may interact with an input mechanism (e.g., a button, a touch screen, etc.) to provide the indication.

Real-time content may refer to content that is provided by content providing device 210 to content receiving device 220 as content providing device 210 is receiving and/or capturing the content. For example, content providing device 210 may receive the content using a recording device, such as a video recorder (e.g., a camcorder, a camcorder application, etc.), an image recorder (e.g., a camera, a camera application, etc.), an audio recorder (e.g., a microphone, a microphone application, etc.), or the like. As the real-time content is being recorded, content providing device 210 may stream the real-time content to content receiving device 220. Additionally, or alternatively, content, other than real-time content, that was previously recorded by content providing device 210 may be later streamed to content receiving device 220.

As further shown in FIG. 4, process 400 may include identifying users and/or devices to receive the real-time content (block 420). For example, content providing device 210 may identify, based on user input, a receiving user and/or a receiving device (e.g., content receiving device 220) to receive the real-time content. In some implementations, the user may interact with content providing device 210 to identify the receiving user and/or the receiving device. For example, the user may open an application that lists the user's contacts, and may select one or more contacts to receive the real-time content. In some implementations, content providing device 210 may provide an indication of whether a contact is capable of receiving real-time content, whether a contact is subscribed to receive real-time content (e.g., from the user), whether a contact has a particular application installed, etc., and may permit the user to select only contacts with this capability, subscription, installation, etc.

A contact may be identified by a user identifier and/or a device identifier, in some implementations. For example, the contact may be identified by a user identifier, such as a user name, a user email address, a user social media account identifier, or the like. As another example, the contact may be identified by a device identifier, such as mobile telephone number (MTN), an international mobile subscriber identity (IMSI), a network address (e.g., an internet protocol (IP) address, a media access control (MAC) address, etc.), or the like.

As further shown in FIG. 4, process 400 may include identifying a dynamic content address for streaming the real-time content (block 430). For example, content providing device 210 may identify a dynamic content address associated with content providing device 210. The dynamic content address may represent a network address from which content providing device 210 streams real-time content (e.g., using a streaming component, such as a virtual streaming server on content providing device 210, a streaming application of content providing device 210, etc.). Content receiving device 220 may access the streaming real-time content from content providing device 210 using the dynamic content address.

As an example, the dynamic content address may include an IP address associated with content providing device 210, and/or a port identifier via which streaming content can be accessed from content providing device 210. Additionally, or alternatively, the dynamic content address may include a MAC address or another type of identifier that may be used to locate content providing device 210 on a network. In some implementations, the dynamic content address may change between different communication sessions (e.g., for a first streaming session, for a second streaming session, etc.) and/or during a communication session. For example, if the IP address of content providing device 210 changes, then content providing device 210 may identify a new dynamic content address, and/or may provide the new dynamic content address to content receiving device 220.

As further shown in FIG. 4, process 400 may include providing the dynamic content address (block 440). For example, content providing device 210 may provide the dynamic content address to content receiving device 220. In some implementations, content providing device 210 may provide the dynamic content address to a particular content receiving device 220 corresponding to a contact that is to receive the real-time content. Additionally, or alternatively, content providing device 210 may provide the dynamic content address to a destination associated with a contact.

For example, content providing device 210 may provide the dynamic content address via a text message (e.g., a short message service (SMS) message, a multimedia message service (MMS) message, etc.), such as by using a mobile telephone number associated with content receiving device 220. As another example, content providing device 210 may provide the dynamic content address via an email message, such as by sending the dynamic content address to an email address associated with a contact. Additionally, or alternatively, content providing device 210 may provide the dynamic content address via a social media message, such as by sending the dynamic content address to a social media account associated with a contact. In some implementations, content providing device 210 may embed the dynamic content address in a link, so that a contact may interact with the link to access the streaming content.

As further shown in FIG. 4, process 400 may include streaming the real-time content accessible via the dynamic content address (block 450). For example, content providing device 210 may stream the real-time content using the dynamic content address, and one or more content receiving devices 220 may access the streaming content via the dynamic content address. For example, content providing device 210 may record live audio and/or video, and may provide the live recording via the dynamic content address. Content receiving device 220 may request to access the real-time content, and content providing device 210 may stream the real-time content to content receiving device 220 based on receiving the request. In some implementations, content providing device 210 may store the real-time content so that the content can be streamed to content receiving device 220 at a later time.

As further shown in FIG. 4, process 400 may include accessing the streaming real-time content via the dynamic content address (block 460). For example, content receiving device 220 may access the real-time content, streaming from content providing device 210, using the dynamic content address. In some implementations, content receiving device 220 may receive the dynamic content address, and a contact associated with content receiving device 220 may interact with the dynamic content address, such as by clicking on a link that includes the dynamic content address. The contact (e.g., a user) may provide input that causes content receiving device 220 to access the content, from content providing device 210, via the dynamic content address. Based on the input, content receiving device 220 may access the streaming content.

In some implementations, multiple content receiving devices 220 may access the streaming content at the same time (e.g., concurrently, simultaneously, etc.). In this case, content providing device 210 may provide information, to a first content receiving device 220, that identifies a second content receiving device 220 that is accessing the streaming content (e.g., a device identifier of the second content receiving device 220, a user identifier associated with the second content receiving device 220, etc.). In this way, users associated with different content receiving devices 220 may communicate with one another (e.g., regarding the streaming content).

In some implementations, content receiving device 220 may access content stored by content providing device 210, such as stored content associated with the streaming content. As an example, content providing device 210 may store real-time content in case content receiving device 220 does not access the content from the beginning of the stream. In this case, a contact associated with content receiving device 220 may interact with content receiving device 220 to rewind the content, to play the content from the beginning, or the like. Additionally, or alternatively, content receiving device 220 may store the streaming content for later presentation.

As further shown in FIG. 4, process 400 may include providing the streaming real-time content for display and/or to a dongle device (block 470). For example, content receiving device 220 may provide the streaming real-time content, received from content providing device 210. In some implementations, content receiving device 220 may provide the streaming content for presentation on a display of content receiving device 220, may provide the streaming content from a speaker of content receiving device 220, or the like.

Additionally, or alternatively, content receiving device 220 may provide the streaming content to another device for presentation (e.g., for audio presentation, for video presentation, etc.). For example, content receiving device 220 may provide the streaming content to output device 240. In some implementations, content receiving device 220 may provide the streaming content to output device 240 via dongle device 230. For example, content receiving device 220 may provide the streaming content to dongle device 230, such as via a network (e.g., a wireless network, a near-field communication network, a Bluetooth network, a Wi-Fi network, etc.).

In some implementations, such as when the streaming content is to be provided to dongle device 230 for output by output device 240, content receiving device 220 may require communicative proximity between content receiving device 220 and dongle device 230 before permitting the contact to access the content. For example, content receiving device 220 may not provide an option for the contact to stream the content via output device 240 unless content receiving device 220 detects that dongle device 230 is within communicative proximity of content receiving device 220.

As further shown in FIG. 4, process 400 may include receiving the streaming real-time content (block 480), and providing the streaming real-time content for output by an output device (block 490). For example, dongle device 230 may receive the streaming real-time content from content receiving device 220 (e.g., via a network). Dongle device 230 may provide the streaming real-time content to output device 240, and output device 240 may output the streaming real-time content (e.g., via audio output, via video output, etc.). In some implementations, dongle device 230 may provide the streaming real-time content to output device 240 via an audio and/or video interface, such as an HDMI interface, a USB interface, or the like.

By providing the streaming content via output device 240, a contact may be free to use content receiving device 220 to communicate with a user streaming the content via content providing device 210, where such communication may otherwise be difficult when content receiving device 220 is streaming the content. For example, the contact may interact with a mobile phone (e.g., content receiving device 220), to interact with the user (e.g., via content providing device 210, such as another mobile phone), while watching the content on a television (e.g., output device 240). The contact and the user may interact via, for example, text messaging, a voice call, social media, or the like.

In this way, a first user that is at a live event may share real-time content from the live event with a second user, even if the second user is not at the live event. The second user may consume the real-time content using a mobile phone, in some implementations, or may use the mobile phone to transfer the real-time content to another output device (e.g., with a large display, more powerful speakers, etc.) so that the second user may better enjoy the real-time content. Furthermore, multiple users that are in different geographic locations may share real-time content.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
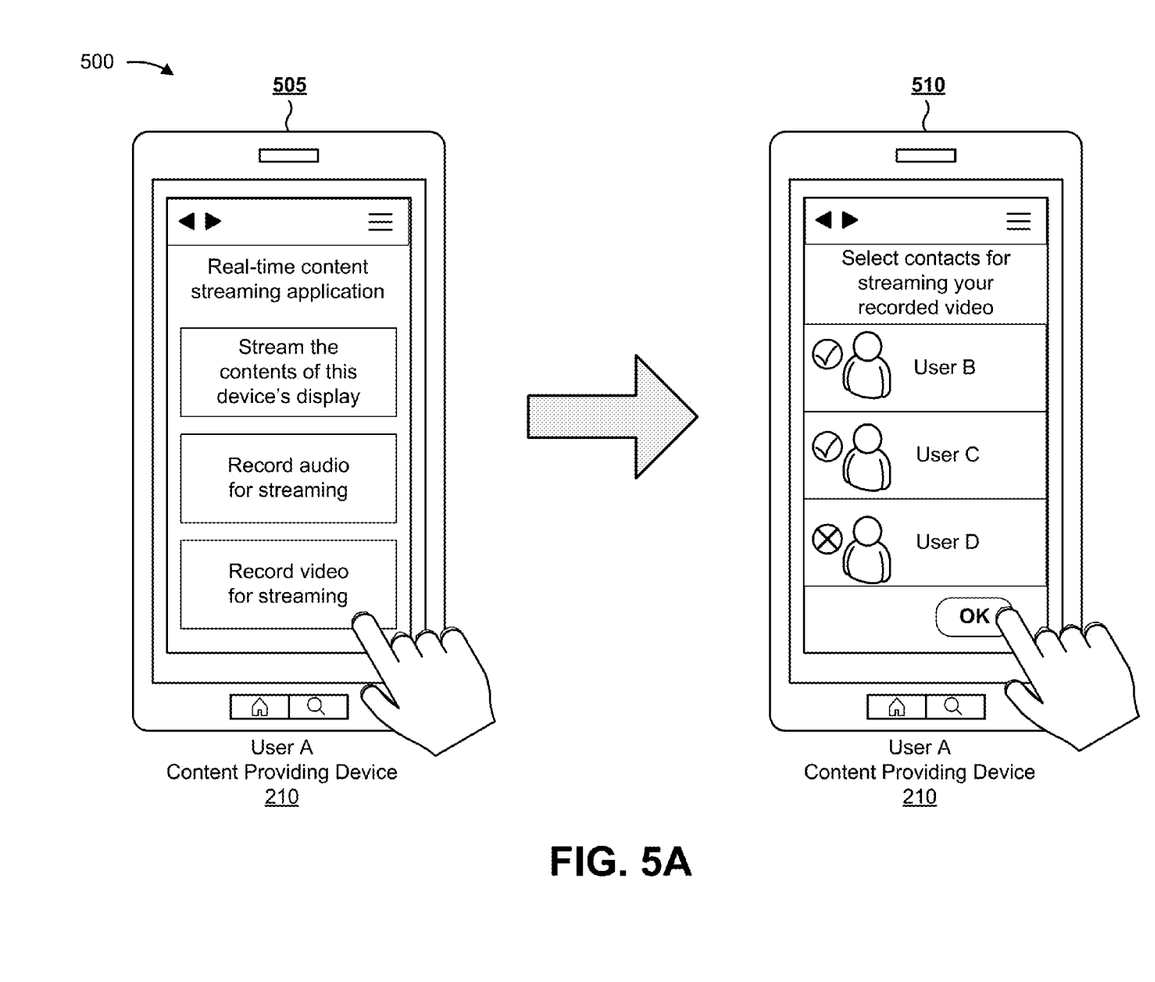
FIGS. 5A-5C are diagrams of an example implementation relating to the example process shown in FIG. 4.
Figure 5B:
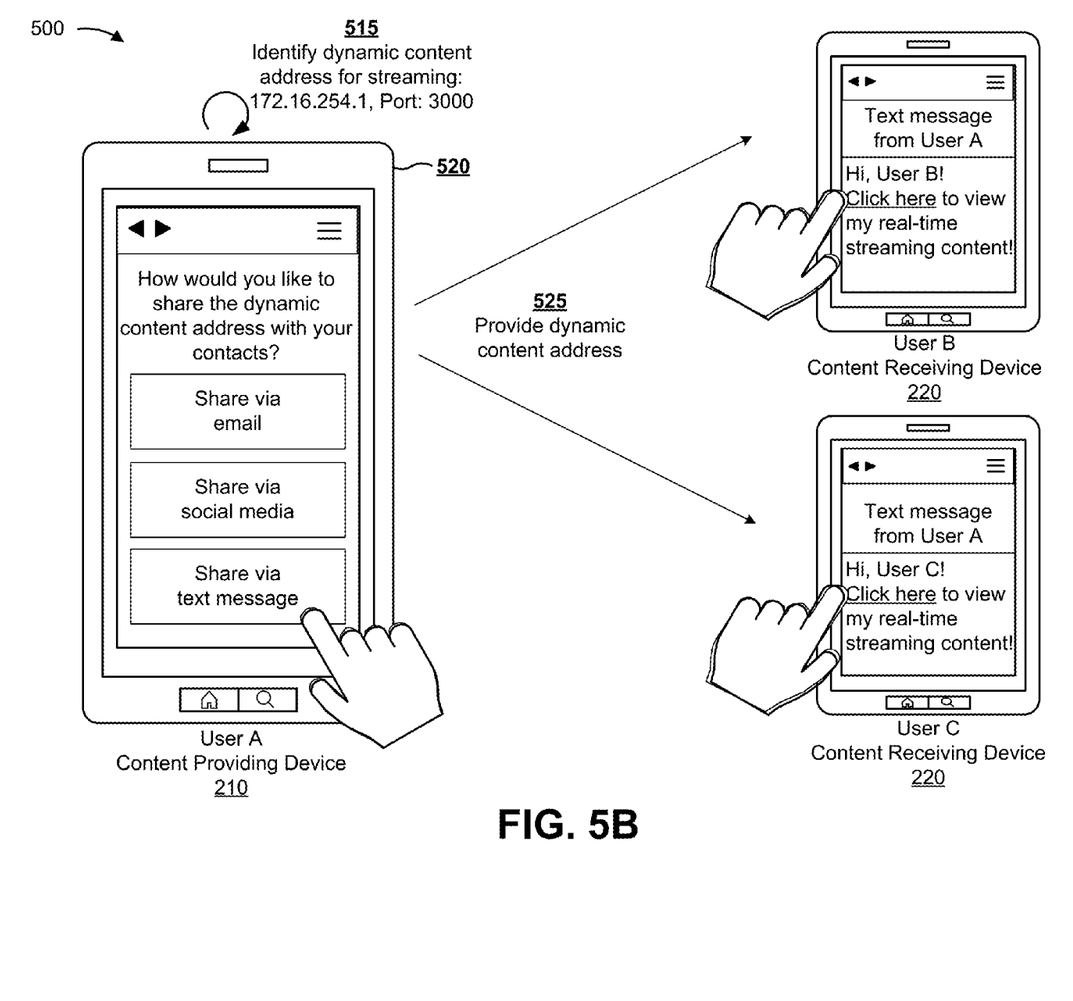
Figure 5C:
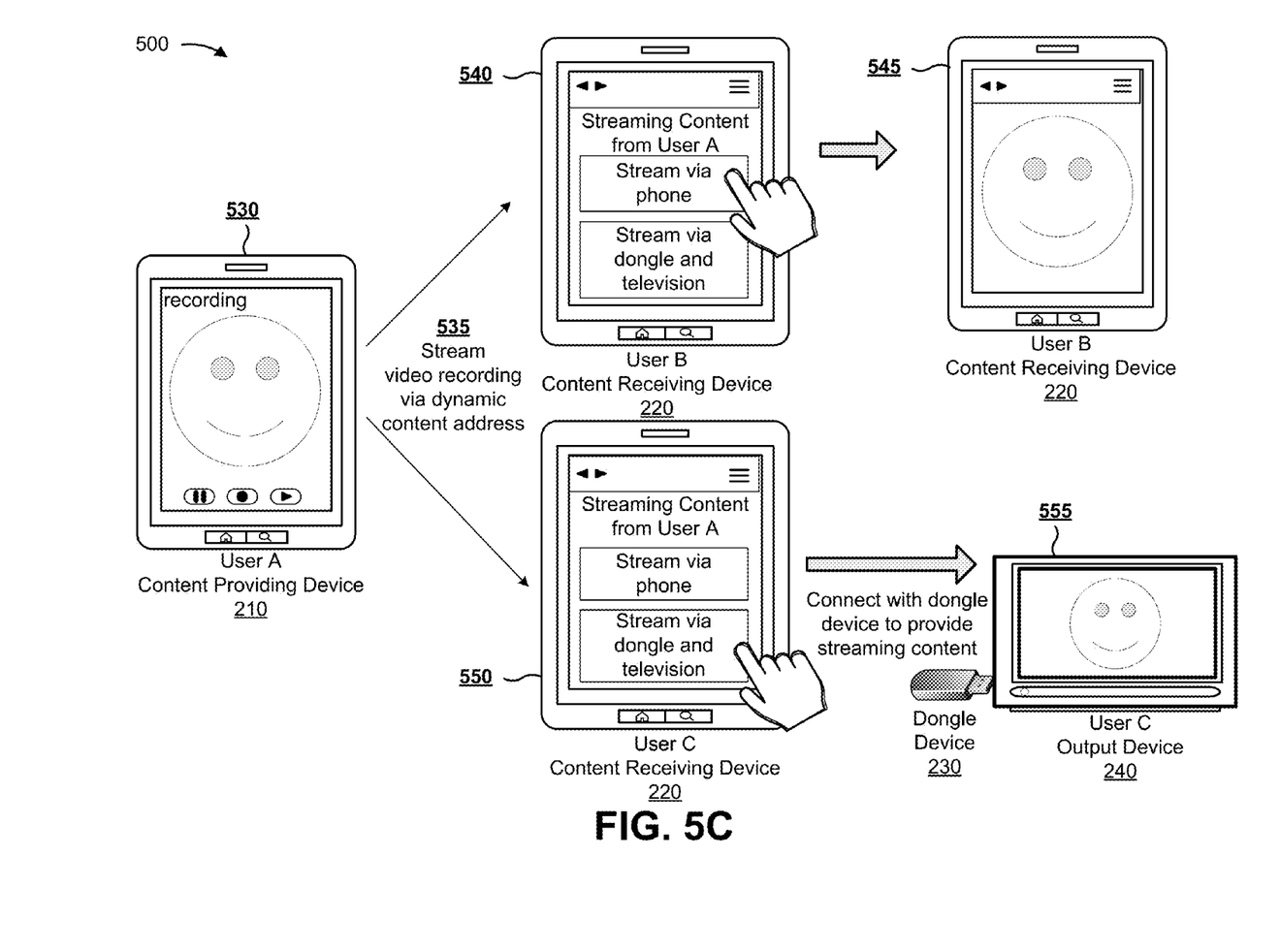

FIGS. 5A-5C are diagrams of an example implementation 500 relating to example process 400 shown in FIG. 4. FIGS. 5A-5C show an example of mobile-to-mobile streaming of real-time content for output by an output device.

As shown in FIG. 5A, and by reference number 505, assume that User A interacts with a real-time content streaming application executing on User A's content providing device 210 (e.g., User A's smart phone). The real-time content streaming application may permit content providing device 210 to stream real-time content to another device. As shown, User A may interact with an input mechanism (e.g., a button) to cause content providing device 210 to stream the contents of the display of content provide device 210, to record audio for streaming using content providing device 210, to record video for streaming using content providing device 210, or the like. As shown, assume that User A selects to record video for streaming via content providing device 210.

As shown by reference number 510, assume that the user selection causes content providing device 210 to provide a list of User A's contacts for display (e.g., based on contact information stored by and/or accessible by User A's content providing device 210). User A may interact with content providing device 210 to select one or more contacts (and/or devices associated with those contacts) to receive the streaming video recording. As shown, assume that User A selects to share the streaming video recording with User B and User C, and selects not to share the streaming video recording with User D.

As shown in FIG. 5B, and by reference number 515, content providing device 210 identifies a dynamic content address, associated with content providing device 210, for streaming the video recording. As shown, assume that the dynamic content address includes an IP address of 172.16.254.1, and a port identifier of 3000. As shown by reference number 520, after User A has selected contacts with which to share the video recording, content providing device 210 may provide the user with options for sharing the dynamic content address. For example, content providing device 210 may share the dynamic content address via email, via social media, via a text message, or the like. As shown, assume that User A selects to share the dynamic content address with User B and User C via text message.

As shown by reference number 525, based on the user interaction, content providing device 210 provides the dynamic content address, via a text message, to User B's content receiving device 220 and User C's content receiving device 220. As shown, assume that content providing device 210 provides the dynamic content address via a link in the text message. Assume that User B and User C interact with the link to cause their respective content receiving devices 220 to access the video recording via the dynamic content address via which content providing device 210 provides the video recording.

As shown in FIG. 5C, and by reference number 530, assume that User A is recording a video using content providing device 210. As shown by reference number 535, content providing device 210 streams the video recording to User B's content receiving device 220 and User C's content receiving device 220 via the dynamic content address. In some implementations, content receiving device 220 may provide an option for a user to stream the real-time content using content receiving device 220 (e.g., a mobile phone), and/or to provide the streaming real-time content to output device 240.

As shown by reference number 540, assume that User B selects to stream the video recording using User B's content receiving device 220 (e.g., a phone). As shown by reference number 545, based on this interaction, assume that User B's content receiving device 220 streams the video recording (e.g., by providing the video recording for display as the video recording is received from content providing device 210). In this way, User B may experience a live event, via User B's mobile device, as User A is recording the live event.

As shown by reference number 550, assume that User C selects to stream the video recording using User C's output device 240 (e.g., a television). As shown by reference number 555, based on this interaction, assume that User C's content receiving device 220 provides the streaming video recording to dongle device 230, which provides the streaming video recording to output device 240, which provides the video recording for display as the video recording is received from content providing device 210. In some implementations, User C's content receiving device 220 may determine whether dongle device 230 is within communicative proximity of (e.g., connected to the same local network as) content receiving device 220 before providing User C with an option to stream the video recording via User C's output device 240. In this way, User C may experience a live event, via User C's television, as User A is recording the live event.

As indicated above, FIGS. 5A-5C are provided merely as an example. Other examples are possible and may differ from what was described with regard to FIGS. 5A-5C.

Implementations described herein assist in streaming real-time content between mobile devices, and further assist in streaming the real-time content from a mobile device to an output device, such as a television. In this way, multiple users may experience a live event together, even if all of the users are not present at a location where the live event is occurring.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A mobile device, comprising:
one or more processors to:
receive an indication to stream live content, in real time, as real-time content,
the live content including content captured live by the mobile device;
identify a dynamic content address, associated with the mobile device, to be used by a content receiving device to access the real-time content,
the content receiving device being associated with a contact and a device identifier, and
the dynamic content address identifying a network address of the mobile device from which the real-time content is to be streamed;
provide the dynamic content address to the content receiving device via at least one of:
a text message addressed to the device identifier,
an email message addressed to an email address associated with the contact, or
a social media message addressed to a social media account associated with the contact;
receive, from the content receiving device, a request to access the real-time content, via the dynamic content address, based on providing the dynamic content address; and
stream the real-time content to the content receiving device, using the dynamic content address, based on receiving the request.

2. The mobile device of claim 1, where the real-time content includes a video of a live event being recorded by the mobile device.

3. The mobile device of claim 1, where the real-time content includes information displayed on a display of the mobile device.

4. The mobile device of claim 1, where the one or more processors are further to:
receive information that identifies the contact,
the real-time content to be shared with the contact;
determine the device identifier based on the information that identifies the contact,
the device identifier identifying the content receiving device; and
provide the dynamic content address to the content receiving device using the device identifier.

5. The mobile device of claim 1, where the one or more processors are further to:
receive, from a plurality of content receiving devices, a respective plurality of requests to access the real-time content,
the plurality of content receiving devices including the content receiving device,
the respective plurality of requests including the request; and
stream the real-time content to the plurality of content receiving devices, using the dynamic content address, based on receiving the plurality of requests.

6. The content providing device of claim 1, where the dynamic content address includes:

an Internet protocol address that identifies the mobile device on a network; and
a port identifier that identifies a port, of the mobile device, via which the real-time content can be accessed by the content receiving device.

7. The mobile device of claim 1, where the content receiving device is to:
provide the real-time content for presentation; or
provide the real-time content to an output device for presentation,
the output device being different from the content receiving device.

8. A non-transitory computer-readable medium storing instructions, the instructions comprising:
one or more instructions that, when executed by one or more processors of a mobile device, cause the one or more processors to:
receive an indication to stream live content, in real time, as real-time content,
the live content being including content captured live by the mobile device;
identify a dynamic content address, associated with the mobile device, to be used by a content receiving device to access the real-time content,
the content receiving device being associated with a contact and a device identifier, and
the dynamic content address including a network address, associated with the mobile device, via which the real-time content is to be streamed;
provide, to the content receiving device, information that identifies the dynamic content address via at least one of:
a text message addressed to the device identifier,
an email message addressed to an email address associated with the contact, or
a social media message addressed to a social media account associated with the contact;
receive, from the content receiving device, a request to access the real-time content, via the dynamic content address, based on providing the information that identifies the dynamic content address; and
stream the real-time content to the content receiving device, using the dynamic content address, based on receiving the request.

9. The non-transitory computer-readable medium of claim 8, where the real-time content includes audio being recorded by the mobile device.

10. The non-transitory computer-readable medium of claim 8, where the instructions further comprise:
one or more instructions that, when executed by the one or more processors, cause the one or more processors to:
provide a link for accessing the dynamic content address; and
receive the request based on an interaction with the link.

11. The non-transitory computer-readable medium of claim 8, where the instructions further comprise:
one or more instructions that, when executed by the one or more processors, cause the one or more processors to:
receive information that identifies the contact;
determine the device identifier based on the information that identifies the contact; and
provide the information that identifies the dynamic content address to the content receiving device using the device identifier.

12. The non-transitory computer-readable medium of claim 8, where dynamic content address includes:
- an Internet Protocol address that identifies the mobile device on a network; and
- a port identifier that identifies a port, of the mobile device, via which the real-time content can be accessed by the content receiving device.

13. The non-transitory computer-readable medium of claim 8, where the instructions further comprise:
- one or more instructions that, when executed by the one or more processors, cause the one or more processors to:
  - receive, from a plurality of content receiving devices, a respective plurality of requests to access the real-time content,
    - the plurality of content receiving devices including the content receiving device,
    - the respective plurality of requests including the request; and
  - stream the real-time content to the plurality of content receiving devices, using the dynamic content address, based on receiving the plurality of requests.

14. The non-transitory computer-readable medium of claim 8, where the instructions further comprise:
- one or more instructions that, when executed by the one or more processors, cause the one or more processors to:
  - store the real-time content as stored content for later streaming; and stream the stored content.

15. A method, comprising:
- receiving, by a first mobile device, a dynamic content address to be used by the first mobile device to access live content streamed, in real time as real-time content, from a second mobile device,
  - the first mobile device being associated with a contact and a device identifier,
  - the dynamic content address identifying a network address of the second mobile device,
  - the live content including content captured live by the second mobile device,
  - the second mobile device being different from the first mobile device, and
  - the dynamic content address being received via at least one of:
    - a text message addressed to the device identifier,
    - an email message addressed to an email address associated with the contact, or
    - a social media message addressed to a social media account associated with the contact;
- requesting, by the first mobile device, the real-time content from the second mobile device using the dynamic content address;
- receiving, by the first mobile device, the real-time content streamed from the second mobile device via the dynamic content address; and
- providing, by the first mobile device, the real-time content to a dongle device for output by an output device,
  - the dongle device being different from the first mobile device, the second mobile device, and the output device, and
  - the output device being different from the first mobile device, the second mobile device, and the dongle device.

16. The method of claim 15, further comprising:
establishing a connection with the dongle device; and
providing the real-time content to the dongle device based on establishing the connection with the dongle device.

17. The method of claim 15, where the real-time content includes at least one of:
- video content being captured by the second mobile device;
- audio content being captured by the second mobile device; or
- content being provided for presentation on a display of the second mobile device.

18. The method of claim 15, where the dynamic content address identifies a network address, associated with the second mobile device, from which the real-time content is streamed.

19. The method of claim 15, further comprising:
providing the real-time content for presentation by the first mobile device.

20. The method of claim 15, further comprising:
detecting that the first mobile device and the dongle device are within communicative proximity; and
providing the real-time content to the dongle device based on detecting that the first mobile device and the dongle device are within communicative proximity.

* * * * *